US010989172B2

(12) United States Patent
Bæk et al.

(10) Patent No.: US 10,989,172 B2
(45) Date of Patent: Apr. 27, 2021

(54) METHOD FOR DETERMINING THE DEFLECTION OF A WIND TURBINE BLADE USING THE WIND TURBINE BLADE'S KNOWN MODAL PROFILE

(71) Applicant: LM WP PATENT HOLDING A/S, Kolding (DK)

(72) Inventors: Peter Bæk, Jelling (DK); Michael Klitgaard, Odense S (DK); Claus Byskov, Silkeborg (DK)

(73) Assignee: LM WP PATENT HOLDING A/S, Kolding (DK)

( * ) Notice: Subject to any disclaimer, the term of this patent is extended or adjusted under 35 U.S.C. 154(b) by 420 days.

(21) Appl. No.: 15/509,636

(22) PCT Filed: Sep. 10, 2015

(86) PCT No.: PCT/EP2015/070744
§ 371 (c)(1),
(2) Date: Mar. 8, 2017

(87) PCT Pub. No.: WO2016/038151
PCT Pub. Date: Mar. 17, 2016

(65) Prior Publication Data
US 2017/0260967 A1 Sep. 14, 2017

(30) Foreign Application Priority Data
Sep. 12, 2014 (EP) .................................... 14184601

(51) Int. Cl.
*F03D 17/00* (2016.01)
*F03D 7/04* (2006.01)
(Continued)

(52) U.S. Cl.
CPC ............ *F03D 17/00* (2016.05); *F03D 1/0675* (2013.01); *F03D 7/0224* (2013.01); *F03D 7/045* (2013.01);
(Continued)

(58) Field of Classification Search
CPC ............ F05B 2260/83; F05B 2270/821; F05B 2270/33; F05B 2270/17; F03D 7/045; F05D 2260/81
See application file for complete search history.

(56) References Cited

U.S. PATENT DOCUMENTS

2010/0084864 A1*  4/2010  Lucks ................... F03D 17/00
                                                      290/44
2010/0140936 A1*  6/2010  Benito .................. F03D 17/00
                                                      290/44
(Continued)

FOREIGN PATENT DOCUMENTS

DE   102010019014 A1   11/2011
WO      2005068834 A1    7/2005
WO      2014027032 A2    2/2014

OTHER PUBLICATIONS

"Introduction to Operating Defection Shapes" Brian J. Schwarz and Mark H. Richardson; Vibrant Technologty, Inc. Jamestown California 95327. Oct. 1999. (Year: 1999).*

*Primary Examiner* — Bryan M Lettman
*Assistant Examiner* — Timothy P Solak
(74) *Attorney, Agent, or Firm* — Nath, Goldberg & Meyer; Jerald L. Meyer; Tanya E. Harkins (57) ABSTRACT

A method for the determination of the deflection of a wind turbine blade is provided. A distance between at least one root location towards a root end of the wind turbine blade and at least one tip location towards a tip end of the wind turbine blade is measured. A blade deflection profile is then calculated based on the measured distance between the root (Continued)

and tip locations and a known modal profile of the wind turbine blade.

13 Claims, 5 Drawing Sheets (51) Int. Cl.
  F03D 1/06 (2006.01)
  F03D 7/02 (2006.01)
  G01C 3/06 (2006.01)
  G01S 11/02 (2010.01)
(52) U.S. Cl.
  CPC ............... G01C 3/06 (2013.01); G01S 11/02 (2013.01); *F05B 2260/83* (2013.01); *F05B 2270/17* (2013.01); *F05B 2270/33* (2013.01); *F05B 2270/821* (2013.01); *F05D 2240/307* (2013.01); *F05D 2260/81* (2013.01); *Y02E 10/72* (2013.01)

(56) References Cited

U.S. PATENT DOCUMENTS

| | | | | |
|---|---|---|---|---|
| 2010/0158687 A1* | 6/2010 | Dawson | ............... | F03D 7/0236 416/31 |
| 2010/0253569 A1* | 10/2010 | Stiesdal | ............... | G01B 11/026 342/118 |
| 2011/0103933 A1* | 5/2011 | Olesen | ................... | G01B 11/16 415/118 |
| 2011/0150648 A1* | 6/2011 | Andersen | ................ | F03D 17/00 416/61 |
| 2011/0268569 A1* | 11/2011 | Loh | ........................ | F03D 7/042 416/1 |

* cited by examiner

METHOD FOR DETERMINING THE DEFLECTION OF A WIND TURBINE BLADE USING THE WIND TURBINE BLADE'S KNOWN MODAL PROFILE

This is a National Phase Application filed under 35 U.S.C. 371 as a national stage of PCT/EP2015/070744, filed Sep. 10, 2015, an application claiming the priority benefit of EP 14184601.4 filed Sep. 12, 2014, the content of each of which is hereby incorporated by reference in its entirety.

FIELD OF THE INVENTION

The present invention relates to a system and method for determining a deflection of a wind turbine blade.

BACKGROUND OF THE INVENTION

During operation of a wind turbine, considerable forces act on the blades of the wind turbine, bending and deflecting the blades. Such deflection can be so extreme as to cause the wind turbine blade tips to strike the tower of the wind turbine, thereby causing damage to the blade or event complete failure of the wind turbine structure.

In efforts to reduce the risk of tower strike, wind turbine manufacturers have utilised different techniques in wind turbine construction. In some cases, wind turbines use pre-bent blades, having tip ends which project away from the wind turbine tower, thereby increasing the tip-to-tower clearance. Additionally or alternatively, wind turbine manufacturers design wind turbines to have increased tilt angle and/or distance from the tower of the wind turbine rotor. Such solutions present additional complications in the area of cost and constructional challenges.

A further option is to accurately monitor the location of the tip end of the wind turbine blades, and to control the wind turbine accordingly. For example, if the tip location of a blade is detected to be deflected towards the tower to an extent that there is a danger of a tower strike, the wind turbine may be controlled to pitch the wind turbine blade to move the tip end of the blade away from the tower. In extreme cases, the wind turbine may be completely stopped to prevent a tower strike.

Such positional monitoring is often performed using a triangulation or trilateration system, which can require the monitoring of the tip end of a wind turbine blade from two-three separate locations, with subsequent calculation of the tip end location. An example of such a system is described in PCT Patent Application Publication No. WO 2005/068834 A1. However, one of the challenges with such systems is ensuring continuous, reliable, and accurate operation of the monitoring systems.

It is an object of the invention to provide for an alternative blade deflection monitoring system, having improved reliability and accuracy.

SUMMARY OF THE INVENTION

Accordingly, there is provided a method of calculating a blade deflection profile of a wind turbine blade having a blade deflection monitoring system, the method comprising the steps of:
  providing a wind turbine blade having a known modal profile;
  measuring a distance between at least one root location towards a root end of the wind turbine blade and at least one tip location towards a tip end of the wind turbine blade; and
  calculating a blade deflection profile based on the measured distance between said root and tip locations and said known modal profile.

By utilizing a known modal profile of a wind turbine blade in the blade deflection monitoring system, the accuracy of the deflection monitoring system can be improved. Using a single distance measurement between known positions on a blade, an accurate blade deflection profile can be calculated based on the predicted mode shapes of the wind turbine blade. Accordingly, the accuracy of the deflection monitoring system can be improved, as it can operate using only a single distance measurement.

Preferably, said blade deflection profile is used as an input to a wind turbine safety system, wherein said blade deflection profile is used to calculate whether the deflection of said wind turbine blade exceeds a safety threshold for a tower strike, and/or when the wind turbine blade is at risk of exceeding a wind turbine design safety envelope.

Determining a blade deflection profile allows for the calculation of the location of a blade tip end. Accordingly, it is possible to estimate if a blade tip will be deflected towards a wind turbine tower, and to judge whether such deflection exceeds a safety margin for the blade tip striking the wind turbine tower. It will be understood that the method may further comprise the step of generating a control signal based on said calculation of whether the deflection of said wind turbine blade exceeds a safety threshold for a tower strike. Such a control signal may be used as an input to a wind turbine control system, which may be operable to adjust wind turbine performance based on said calculation, e.g. to adjust a pitch angle of a wind turbine blade to reduce the risk of a tower strike, or to stop turbine operation to prevent a tower strike.

In an additional or alternative aspect, as wind turbines are generally designed to satisfy particular certification safety limits for turbine operation, it is important that the operation of the turbines does not exceed such safety limits. Accordingly, the deflection monitoring system of the invention may be arranged as an input to a turbine controller to adjust turbine operation such that such safety limits are not exceeded. For example, for a wind turbine design where the stiffness of the wind turbines is reduced, the blade deflection monitoring system of the invention may be arranged to ensure that the turbine operates within the design load envelope for the turbine.

In a further aspect, the method comprises the step of providing a wireless communication link between said at least one root location and said at least one tip location, preferably a wireless radio communication link.

While the system may be employed using optical imaging links, e.g. laser monitoring system, preferably the distance measurement is performed using a radio-frequency communications link, e.g. using a time-of-flight signal calculation to determine a distance measurement. Preferably, the wireless radio communication link is performed using ultra-wideband (UWB) radio systems, which allow for low-power, high-accuracy measurements.

Preferably, the method comprises the step of providing first and second root locations, and/or first and second tip locations, wherein said step of calculating a blade deflection profile is based on a distance measured between the particular root location and tip location combination having the best signal strength, signal quality, and/or (RF) line-of-sight.

During blade rotation, the blade may bend in different directions resulting in interruptions or disruptions of the wireless communication link between the root and the tip end. By providing multiple possible communication links, accordingly the distance measurement can be performed between the root and tip locations having the best quality and/or strength of signal, which can result in a more accurate distance measurement.

In a further aspect, the method comprises the step of calibrating a blade deflection monitoring system, wherein said calibration comprises performing a triangulation or trilateration operation between said first and second root locations and said at least one tip location.

Due to operational drift, it may be useful to be able to re-calibrate the blade deflection monitoring system during operation. Such a re-calibration may be performed by way of a relatively-high-accuracy triangulation or trilateration, using a plurality of location elements. The root locations may be arranged to provide the system with a degree of redundancy relative to blade bending. For example, a first root location may be arranged towards a leading edge of the wind turbine blade, while a second root location may be arranged towards a trailing edge of the wind turbine blade.

In a preferred aspect, the method comprises providing at least first and second tip locations, wherein a first tip location is arranged close to a tip end of a wind turbine blade and a second tip location is located at the node of a second mode shape of the wind turbine blade.

Preferably, the method comprises the steps of:
measuring a first distance from said at least one root location to said first tip location;
measuring a second distance from said at least one root location to said second tip location; and
calculating a blade deflection profile based on said first and second distances and said known modal profile.

Positioning a second tip location at the node of the second mode shape of the blade allows for the first and second modes of the blade to be decoupled from each other. As it is possible to isolate the effect of the second mode shape from the first mode shape, accordingly, the accuracy of the blade deflection calculation can be improved Preferably, the method comprises the steps of:
measuring a distance between two known locations on a wind turbine blade;
calculating a blade mode amplitude based on said measured distance; and
determining the excited blade mode shape of the wind turbine blade using said calculated blade mode amplitude.

The excited blade mode shape can be used to determine the current shape of the wind turbine blade, and preferably can be used to determine a location of the tip end of the wind turbine blade.

In one aspect, said step of calculating a blade mode amplitude is performed continuously as the wind turbine blade is operational on a wind turbine. It will also be understood that the calculation may be performed at intervals, and/or when the wind turbine blade is at certain positions along the rotational path of the blade, e.g. before the blade passes a wind turbine tower.

Preferably, the method comprises the step of calculating a position of a known tip location on a wind turbine blade when said wind turbine blade is deflected or excited, wherein the method comprises the steps of:
defining a root location towards a root end of the wind turbine blade;
defining a tip location towards a tip end of the wind turbine blade; and
defining an intermediate location between said root location and said tip location, wherein said intermediate location is positioned at a point wherein, during excitation of blade, said tip location substantially moves along a notional circle approximately centred at said intermediate location,
wherein the distance between said root location and said intermediate location is known (the root-intermediate distance), and wherein the distance between said intermediate location and said tip location is known (the intermediate-tip distance), the method further comprising the steps of:
measuring the distance between said root location and said tip location during excitation of the wind turbine blade; and
calculating the position of said tip location during excitation of the wind turbine blade based on a trilateration calculation, using the known root-intermediate distance, the known intermediate-tip distance, and the measured root-tip distance.

It will be understood that the intermediate location may be selected to be an approximation of the centre point of a notional circle about which the tip location moves during excitation. Accordingly, the intermediate-tip distance is set to be approximately the radius of such a notional circle. By calculating the position of the tip location during blade excitation or deflection, it is possible to calculate or extrapolate the blade tip position.

It will also be understood that the blade mode amplitude, excited blade mode shape, and/or blade tip location may be pre-calculated for at least some values of measured distances between two known locations on a wind turbine blade, wherein such pre-calculated values may be stored in a storage device and accessible during operation of a wind turbine blade, e.g. in a suitable look-up-table.

By pre-calculating the mode amplitude, mode shape, and/or tip location for at least some measured distances, the processing speed of the method may be increased, leading to a greater responsiveness of the system.

There is further provided a method of controlling a wind turbine, wherein the wind turbine is controlled based on said calculated blade deflection profile, and/or on a control signal generated by a blade deflection monitoring system.

The controlling of the wind turbine may comprise adjustment of blade pitch angle, turbine yaw angle, generator rating. In one aspect, the turbine may be controlled to perform an emergency stop of the wind turbine.

There is further provided a blade deflection monitoring system for a wind turbine blade arranged to implement any aspect of the above-described above.

There is also provided a blade deflection monitoring system for a wind turbine blade, the system comprising:
at least one tip element to be arranged at a location towards the tip end of a wind turbine blade;
at least one root element to be arranged at a location towards the root end of a wind turbine blade;
a distance measurement system arranged to measure a distance between said at least one tip element and said at least one root element; and
a controller arranged to receive a modal profile for a wind turbine blade, the controller operable to calculate a blade deflection profile based on the measured distance between said root and tip locations and said modal profile.

There is further provided a wind turbine blade controller operable to control the operation of a wind turbine based on a calculated blade deflection profile, and/or on a control signal generated by a blade deflection monitoring system.

There is further provided a wind turbine comprising at least one wind turbine blade having a blade deflection monitoring system as described above, and/or a wind turbine blade controller as described above.

DETAILED DESCRIPTION OF THE PREFERRED EMBODIMENTS

Embodiments of the invention will now be described, by way of example only, with reference to the accompanying drawings:

It will be understood that elements common to the different embodiments of the invention have been provided with the same reference numerals in the drawings.

Figure 1:
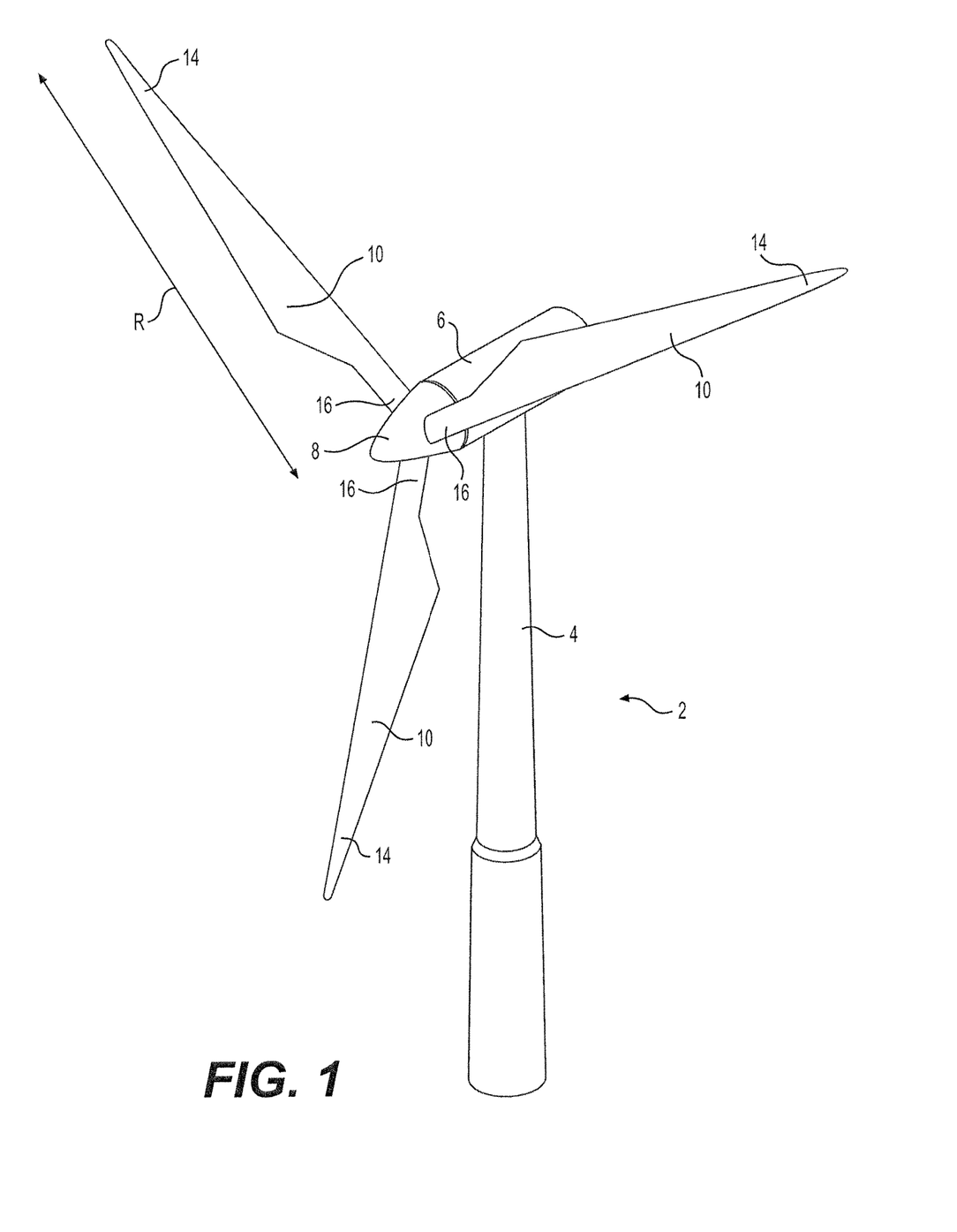
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
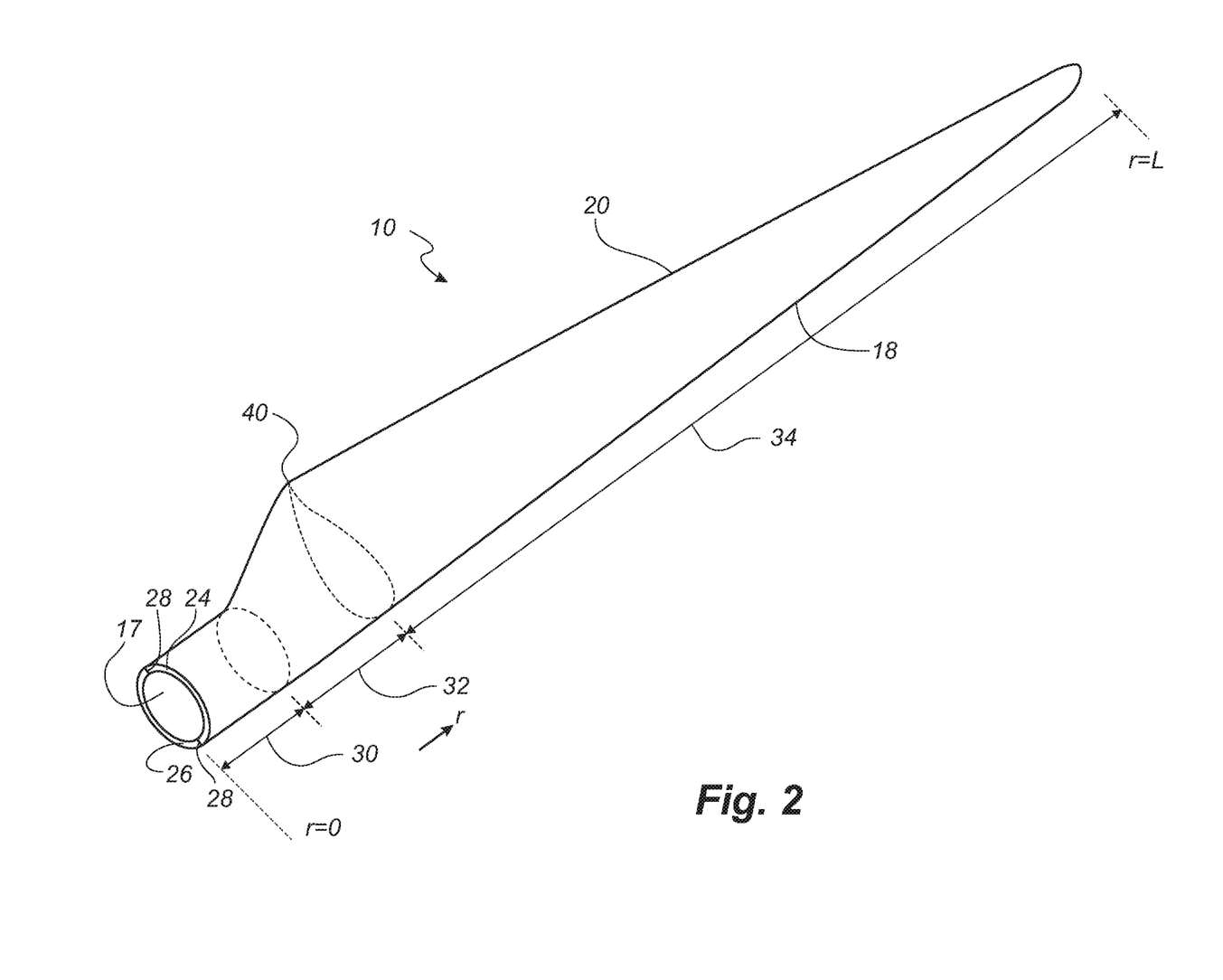
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
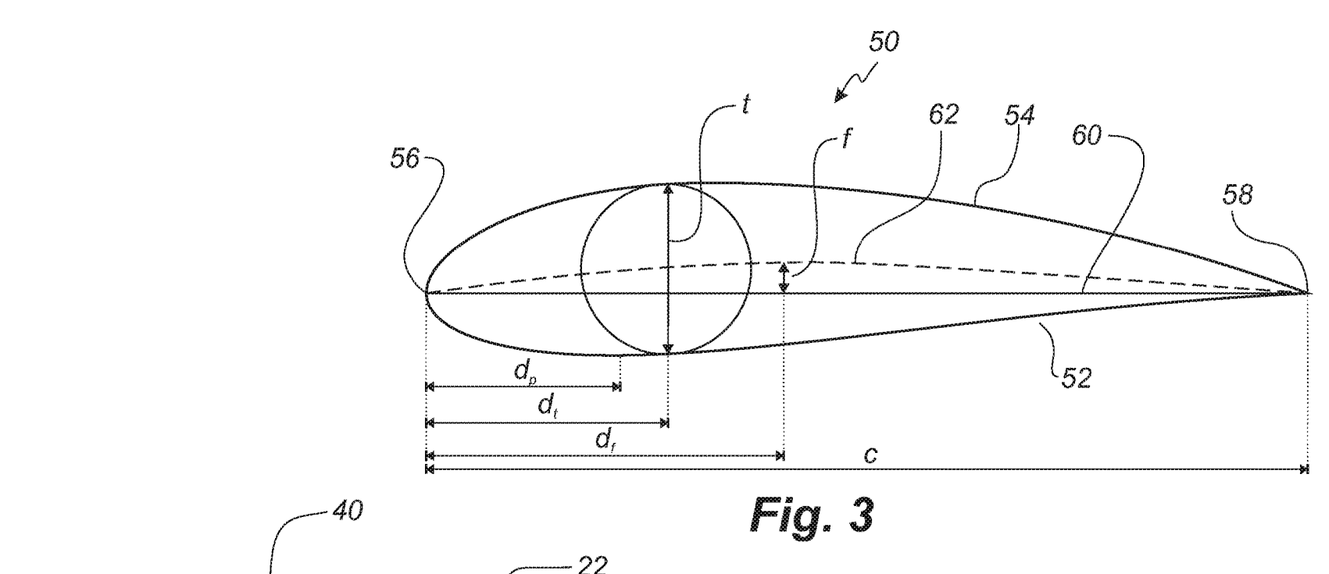
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 4:
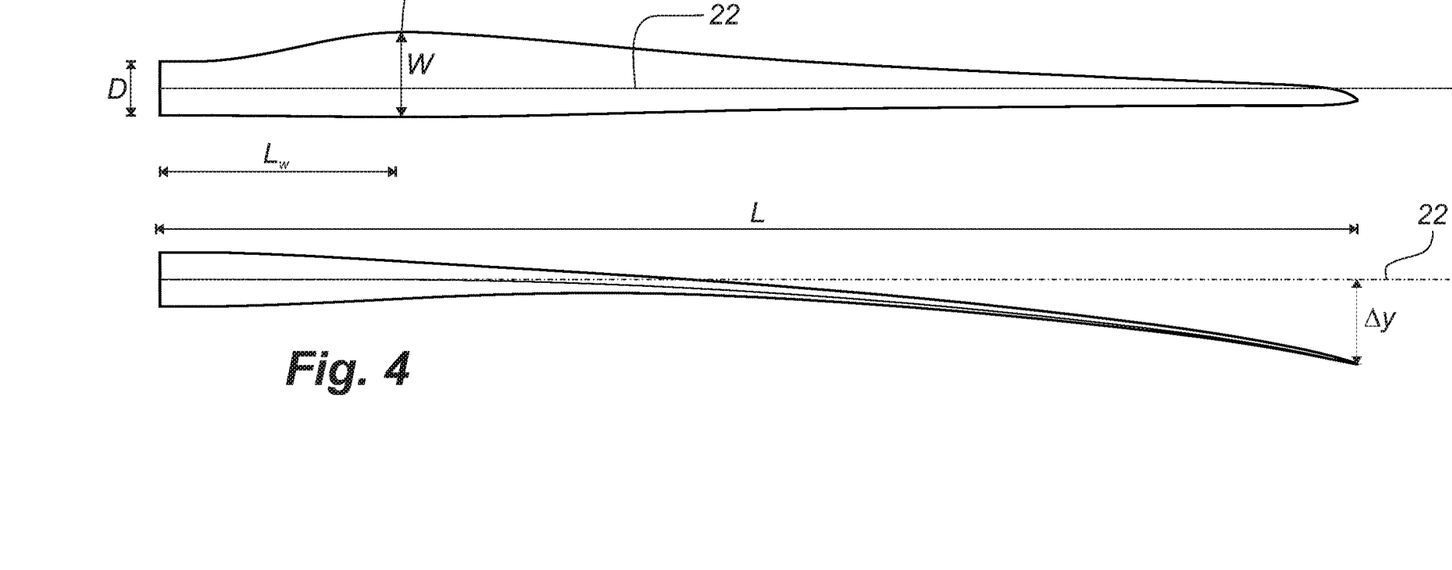
FIG. 4 shows a schematic view of the wind turbine blade of FIG. 2, seen from above and from the side.

FIG. 4 shows some other geometric parameters of the blade. The blade has a total blade length L. As shown in FIG. 2, the root end is located at position r=0, and the tip end located at r=L. The shoulder 40 of the blade is located at a position $r=L_w$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 metres in length, having blade root diameters of several metres. Wind turbine blades are generally designed for relatively long lifetimes and to withstand considerable structural and dynamic loading.

In International Patent Application Publication No. WO14027032, the contents of which are incorporated by reference herein, a blade deflection monitoring system is described wherein at least one wireless communications device is provided towards the root of a wind turbine blade, for communication with at least one wireless communications device located towards the blade tip. The wireless communications devices preferably form an Ultra Wide Band (UWB) communications network. Preferably, the system and method of the invention is implemented using such a configuration, but it will be understood that the invention may equally be implemented using other types of blade deflection monitoring configurations, e.g. laser-based distance measurement, separate discrete position locator devices, etc.

Figure 5:
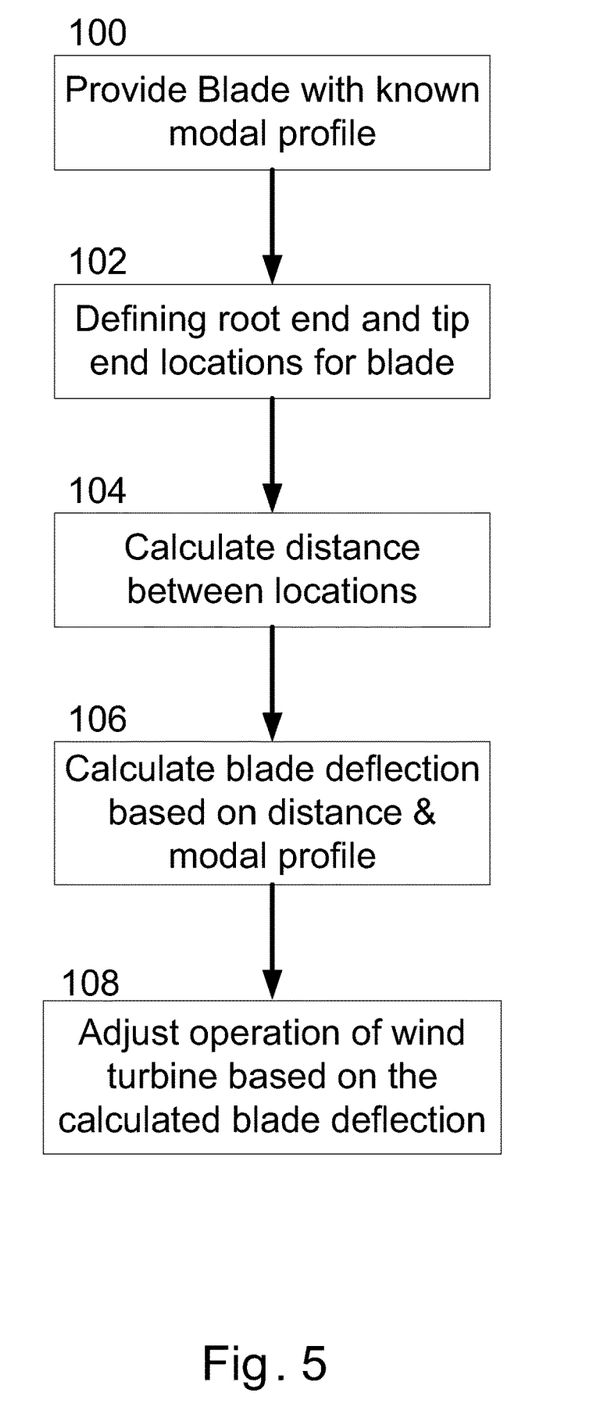
FIG. 5 illustrates a process diagram for a method for determining a blade deflection according to the invention.

With reference to FIG. 5, a method for determining the deflection of a wind turbine blade according to the invention is shown. The wind turbine blade 10 and/or the wind turbine 2 may be provided with a suitable controller (not shown) operable to determine the deflection of a wind turbine blade. Such a controller may be provided as part of a general wind turbine controller, or may be provided as part of a stand-alone data monitoring system, which may be arranged to provide an input signal to a wind turbine controller.

As part of the invention, a wind turbine blade 10 is provided where the blade mode profile of the blade is already known, step 100. The knowledge of the modal profile may be developed from information provided during the initial design process for the wind turbine blade, and/or from measurements performed at an initial testing stage, e.g. during dynamic testing of a wind turbine blade, prior to the supply to and subsequent mounting on a wind turbine. The modal profile may comprise a series of rules determining the shape of the blade for an array of excitation levels, and/or a series of blade shapes which may occur during deflection. The mode shape may be a function of the length of the wind turbine blade.

Having knowledge of the modal characteristics of the wind turbine blade allows for an accurate profiling of the wind turbine blade shape during operation of the wind turbine. Accordingly, such predetermined knowledge of the blade characteristics allow for a deflection profile to be calculated for a wind turbine blade based on a reduced number of sensor inputs when compared to prior art systems.

Once the wind turbine blade 10 having a known modal profile is provided, a set of locations at the root end 16 and the tip end 14 of the blade 10 are defined, step 102. These locations are determined as points on the blade 10 which can be used to provide information as to the current blade mode shape of the wind turbine blade 10. The locations are arranged at a set distance along the length of the wind turbine blade 10, such that any change in the distance between the two locations is as a result of the deflection of the wind turbine blade 10.

Preferably, the root end location is arranged at a point on the wind turbine blade 10 which is expected to be unaffected by blade deflection, while the tip end location is arranged at a point on the wind turbine blade where the greatest blade deflection is expected. Preferably, the tip end location is positioned closely adjacent to or at the tip end 14 of the blade 10, while the root end location is positioned closely adjacent to or at the root end 16 of the blade 10. In an alternative embodiment, the root end location may be positioned on the rotor hub 8 of the wind turbine 2, adjacent to the root end 16 of the wind turbine blade 10 and arranged to co-rotate with the wind turbine blade 10.

During wind turbine operation, the method comprises the step of monitoring the distance between the predetermined root and tip locations, step 104. Preferably, the monitoring comprises measuring a distance using a wireless radio communication link, but it will be understood that other methods of monitoring the distance between the locations may be used, e.g. a light- or laser-based range monitoring system. Alternatively, the position of the root and tip locations may be monitored, e.g. using GPS locators or other similar position monitoring devices, and determining the distance between the locations based on the change in position. Further alternatively, a communication link may be established between the root and tip locations, wherein a change in the characteristics of the communication link, such as the signal phase and/or signal strength of a wireless communications link, can be used as an indicator of the root and tip locations either moving closer together or farther apart from each other.

With the distance between the predetermined root and tip locations established, it is possible to calculate the deflection of the wind turbine blade 10, step 106.

As the distance between two known points on the blade 10 is determined, the measured distance can be used in combination with the known modal profile of the wind turbine blade to determine the position of the tip end location, and furthermore the deflected blade shape.

In one aspect of the invention, as the root end location will not substantially move during blade deflection, the root end location can be taken as a fixed point, against which an array of known blade mode shapes can be compared with, to see which blade mode shape satisfies the measured distance between the fixed root end location and the deflected tip end location. Once the blade mode shape satisfying the measured distance is determined, the deflection of the blade can then be calculated.

Figure 6:
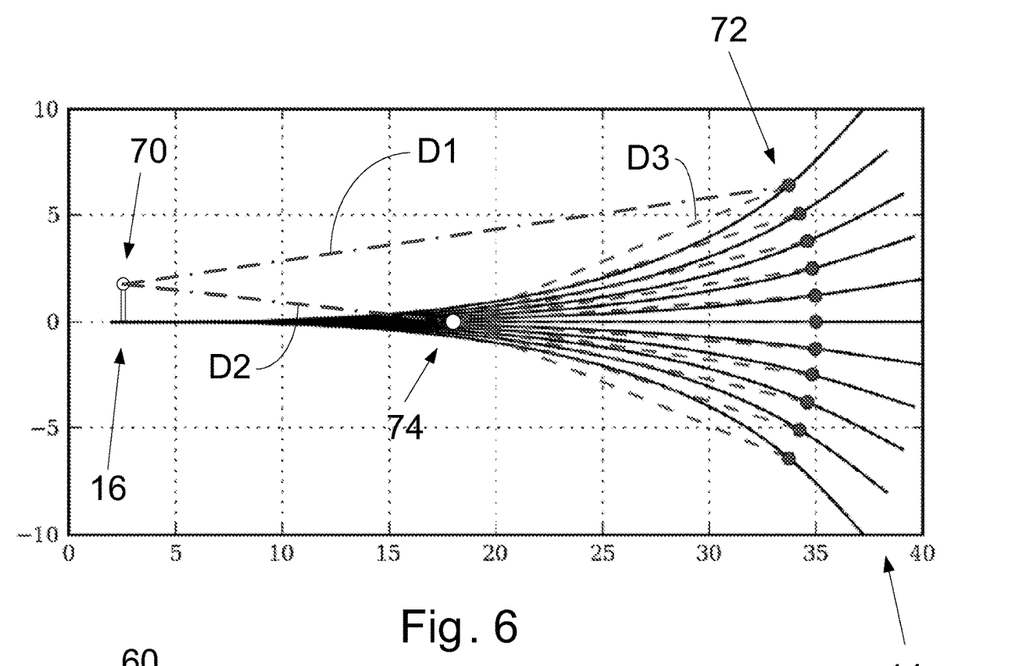
FIG. 6 illustrates a method of calculating a blade deflection based on a measured distance and a blade modal profile.

With reference to FIG. 6, an aspect of the method of calculating the deflection based on the distance between a root location and a tip location is illustrated. In the method of FIG. 6, the deflection is found using a simple triangulation or trilateration calculation.

A root end location is defined at 70, which may comprise a measurement or communication device provided on a support or bracket, located towards the root end 16 of a blade 10. A tip end location is defined at 72, which may comprise a suitable measurement or communication device linked with the root end device, the tip end location positioned towards the tip end 14 of the blade 10. The distance D1 between the root and tip locations 70,72 is monitored according to step 104.

An intermediate location 74 is defined between said root location 70 and said tip location 72. The intermediate location 74 is positioned at a point wherein, during excitation of a blade, the tip location 72 substantially moves along a notional circle approximately centred at the intermediate location 74. The intermediate location 74 is defined wherein the distance between the root location 70 and the intermediate location 74 (the root-intermediate distance, D2) is known, and wherein the distance between the intermediate location 74 and the tip location 72 (the intermediate-tip distance, D3) is known.

During excitation of the blade 10, the tip location 72 may be located at any of a series of possible excitation locations, a selection of which are indicated in FIG. 6. However, the measured distance D1 between the root location 70 and the tip location 72 allows for the actual position of the tip location 72 to be calculated based on a trilateration calculation, using the known root-intermediate distance D2, the known intermediate-tip distance D3, and the measured root-tip distance D1. The actual position of the tip location 72 can then be used to determine the deflection of the wind turbine blade 10.

It will be understood that in embodiments wherein the monitored tip location positioned at the tip end of a blade, the location provides an indication of the current deflected position of the blade tip end.

It will further be understood that in embodiments where the monitored tip location is located in the area of the tip end of the blade, but spaced from the actual tip end, the monitored tip location is indicative of the deflected position of a known location of the wind turbine blade. Knowledge of the range of excited mode shapes of the blade allow for the location of the actual tip end to be determined, as the tip end can be extrapolated from the deflected position of the monitored tip location.

In a further enhancement of the invention, the distance from the root location may be measured to first and second locations positioned towards the blade tip 14. In this embodiment, while the first tip location is positioned close to the actual tip end of the blade, the second tip end is preferably located at the node of the second mode shape of the wind turbine blade 10. By measuring the distance to the node of the second mode, it is possible to decouple the first and second blade modes from each other. Accordingly, the effect of the second mode shape can be isolated from the first mode shape, such that the accuracy of the blade deflection calculation can be improved.

The blade deflection profile calculated in step 106 may be used as an output from the method of the invention. In a further aspect of the invention, the blade deflection profile calculated in step 106 is used as an input to step 108, wherein the control and operation of the wind turbine may be adjusted, based on the blade deflection profile.

In a preferred aspect, the blade deflection profile may be used to determine the possibility of a tower strike from the deflected wind turbine blade 10. In the event that a tower strike is likely, or that the possibility of a tower strike exceeds a certain safety margin threshold, the turbine operation may be adjusted, e.g. by pitching the wind turbine blade 10 such that the blade tip 14 is moved away from the tower 4, and/or by performing a braking of the turbine.

In an enhancement of the invention, information such as the blade mode amplitude, the excited blade mode shape, and/or the blade tip location may be pre-calculated for at least some values of measured distances between two known locations on a wind turbine blade. The pre-calculated values may be stored in a suitable storage device, e.g. a computer-readable storage medium, e.g. a look-up-table, which may be part of or communicatively linked with a suitable controller. The data may then be accessible during operation of a wind turbine blade. By pre-calculating the mode amplitude, mode shape, and/or tip location for at least some measured distances, the processing speed of the method may be increased, leading to a greater responsiveness of the system.

In a further aspect of the invention, the blade deflection monitoring system may be arranged to re-calibrate the deflection monitoring system through re-calculation of the distances between the root and tip locations. Such a re-calibration may be performed through the use of a plurality of root and/or tip locations having suitable devices for the calculation of distance and/or position, e.g. wireless communications devices. The re-calibration of the distanced between locations may be established using suitable triangulation or trilateration calculations between the devices at different locations. In a further aspect of the invention, such a calibration may be performed when the wind turbine blade is arranged in a position of minimum deflection variance, e.g. when the wind turbine blade is arranged in a substantially vertical alignment, pointing towards ground level for the turbine.

Figure 7:
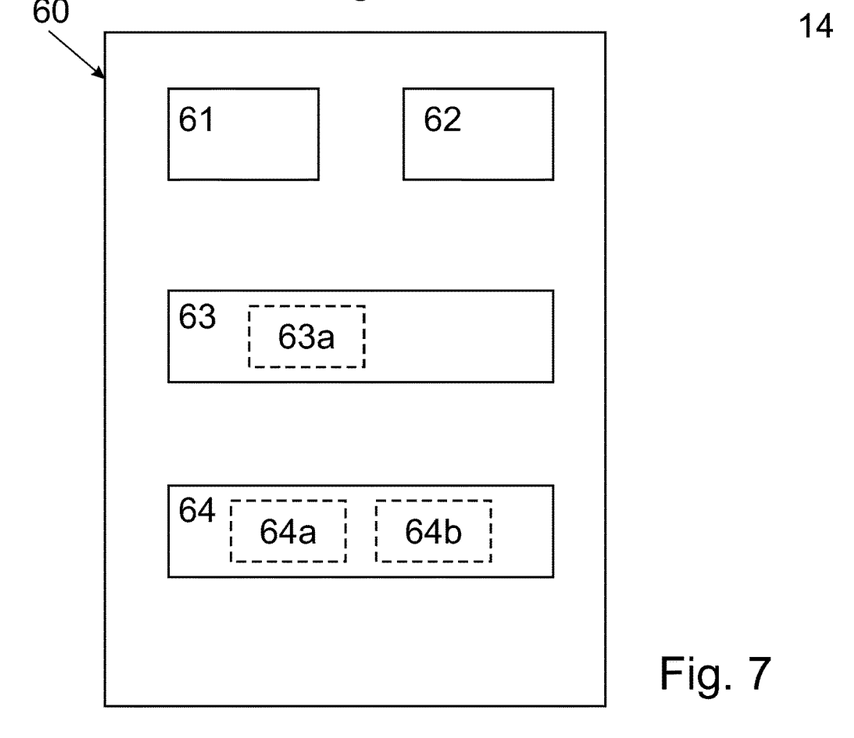
FIG. 7 shows a block diagram of an exemplary blade deflection monitoring system for a wind turbine blade according to an aspect of the invention.

FIG. 7 shows an exemplary blade deflection monitoring system 60 for a wind turbine blade, such as blade 10 of FIG. 1. The blade deflection monitoring system 60 comprises at least one tip element 61 to be arranged at a location towards the tip end of the wind turbine blade, and at least one root element 62 to be arranged at a location towards the root end of the wind turbine blade. The blade deflection monitoring system 60 comprises a distance measurement system 63 arranged to measure a distance between said at least one tip element and said at least one root element. Hence, according to some aspects, the distance measurement system 63 comprises a measurement module 63a configured to measure a distance between said at least one tip element and said at least one root element. The blade deflection monitoring system 60 comprises a controller 64 arranged to receive a modal profile for a wind turbine blade. According to some aspects, the controller 64 comprises a receiver module 64a configured to receive a modal profile for the wind turbine blade. The controller 64 is operable to calculate a blade deflection profile based on the measured distance between said root and tip locations and said modal profile. Hence, according to some aspects, the controller 64 comprises a calculator module 64b configured to calculate a blade deflection profile based on the measured distance between said root and tip locations and said modal profile.

The use of a blade having such system and method for the calculation of blade deflection based on known blade modal profiles allows for a faster, more efficient and more accurate calculation of blade deflection, which can lead to improved control of turbine operation.

The invention is not limited to the embodiments described herein, and may be modified or adapted without departing from the scope of the present invention.

The invention claimed is:

1. A blade deflection monitoring system for a wind turbine blade, comprising:
   at least one tip element to be arranged at a location towards a tip end of the wind turbine blade;
   at least one root element to be arranged at a location towards a root end of the wind turbine blade;
   a distance measurement system arranged to measure a distance between said at least one tip element and said at least one root element; and
   a controller arranged to receive a modal profile for the wind turbine blade, the controller operable to calculate a blade deflection profile based on the measured distance between at least one root and tip locations and said modal profile, wherein said wind turbine blade has at least first and second tip locations, wherein the first tip location is arranged adjacent to the tip end of the wind turbine blade and the second tip location is located at a node of a second mode shape of the wind turbine blade.

2. A method of calculating a blade deflection profile of a wind turbine blade having a blade deflection monitoring system, the method comprising the steps of:
   providing a wind turbine blade having a known modal profile;
   providing at least first and second tip locations, wherein the first tip location is arranged adjacent to a tip end of the wind turbine blade, and the second tip location is located at a node of a second mode shape of the wind turbine blade;

measuring a distance between at least one root location towards a root end of the wind turbine blade and at least one tip location; and calculating the blade deflection profile based on the measured distance between said at least one root and tip locations and said known modal profile.

3. The method of claim 2, wherein the method comprises the steps of:

measuring a first distance from said at least one root location to said first tip location;

measuring a second distance from said at least one root location to said second tip location; and calculating the blade deflection profile based on said first and second distances and said known modal profile.

4. A method of calculating a blade deflection profile of a wind turbine blade having a blade deflection monitoring system, the method comprising the steps of:

providing the wind turbine blade, the wind turbine blade having a known modal profile;

measuring a distance between at least one root location towards a root end of the wind turbine blade and at least one tip location towards a tip end of the wind turbine blade;

providing a wireless communication link between said at least one root location and said at least one tip location, wherein the at least one root location comprises first and second root locations, and/or the at least one tip location comprises first and second tip locations; and calculating the blade deflection profile based on a distance measured between a root and tip location combination and said known modal profile, said calculation of the blade deflection profile being further based on the distance measured between the root location and tip location combination having the signal strength, signal quality, and/or (RF) line-of-sight.

5. The method of claim 4, wherein said blade deflection profile is used as an input to a wind turbine safety system, wherein said blade deflection profile is used to calculate whether the deflection of said wind turbine blade exceeds a safety threshold for a tower strike.

6. A method of controlling a wind turbine, comprising a step of controlling the wind turbine based on the blade deflection profile calculated according to the method as claimed in claim 5, wherein the step of controlling the wind turbine comprises performance of an action selected from the group consisting of adjustment of a blade pitch angle, adjustment of a turbine yaw angle, adjustment of a generator rating, adjustment of an output level, performing an emergency stop of the wind turbine and combinations thereof.

7. The method of claim 4, wherein the method comprises the step of calibrating the blade deflection monitoring system, wherein said calibration comprises performing a triangulation or trilateration operation between said first and second root locations and said at least one tip location.

8. The method of claim 4, wherein the method comprises providing the first and second tip locations, wherein the first tip location is arranged adjacent to the tip end of the wind turbine blade and the second tip location is located at a node of a second mode shape of the wind turbine blade.

9. The method of claim 8, wherein the method comprises the steps of:

measuring a first distance from said at least one root location to said first tip location;

measuring a second distance from said at least one root location to said second tip location; and calculating the blade deflection profile based on said first and second distances and said known modal profile.

10. The method of claim 4, wherein the method comprises the steps of:

measuring a distance between two known locations on a wind turbine blade;

determining a blade mode amplitude based on said measured distance; and determining an excited blade mode shape of the wind turbine blade using said calculated blade mode amplitude.

11. The method of claim 4, wherein the method comprises the step of calculating a position of a known tip location on the wind turbine blade when said wind turbine blade is deflected or excited, wherein the method further comprises the step of:

defining an intermediate location between said root and tip location combination, wherein said intermediate location is positioned at a point wherein, during excitation of the wind turbine blade, said known tip location moves along a notional circle centered at said intermediate location, wherein the distance between said root location of said root and tip location combination and said intermediate location is known (the root-intermediate distance), and wherein the distance between said intermediate location and said known tip location is known (the intermediate-tip distance), the method further comprising the steps of:

measuring the distance between said root location of said root and tip location combination and said known tip location during excitation of the wind turbine blade; and calculating the position of said known tip location during excitation of the wind turbine blade based on a trilateration calculation, using the known root-intermediate distance, the known intermediate-tip distance, and the measured root location of said root and tip location combination and said known tip location distance.

12. The method of claim 4, wherein the wireless communication link comprises a radio communication link.

13. A method of calculating a blade deflection profile of a wind turbine blade having a blade deflection monitoring system, the method comprising the steps of:

providing a wind turbine blade having a known modal profile;

measuring a distance between at least one root location towards a root end of the wind turbine blade and at least one tip location towards a tip end of the wind turbine blade;

calculating the blade deflection profile based on the measured distance between said at least one root location and said at least one tip location and said known modal profile; and calculating a position of a known tip location on the wind turbine blade when said wind turbine blade is deflected or excited, wherein said step of calculating the position of the known tip location comprises:

defining a first root location towards a root end of the wind turbine blade;

defining a first tip location towards a tip end of the wind turbine blade; and defining an intermediate location between said first root location and said first tip location, wherein said intermediate location is positioned at a point wherein, during excitation of the wind turbine blade, said first tip location moves along a notional circle centered at said intermediate location, wherein the distance between said first root location and said intermediate location is known (the root-intermediate distance), and wherein the distance between said intermediate location and said first tip location is known (the intermediate-tip distance);

measuring the distance between said first root location and said first tip location during excitation of the wind turbine blade; and calculating the position of said first tip location during excitation of the wind turbine blade based on a trilateration calculation, using the known root-intermediate distance, the known intermediate-tip distance, and the measured root-tip distance between said first root location and said first tip location.

* * * * *

UNITED STATES PATENT AND TRADEMARK OFFICE
CERTIFICATE OF CORRECTION

PATENT NO. : 10,989,172 B2
APPLICATION NO. : 15/509636
DATED : April 27, 2021
INVENTOR(S) : Peter Bæk, Michael Klitgaard and Claus Byskov It is certified that error appears in the above-identified patent and that said Letters Patent is hereby corrected as shown below:

In the Claims

Claim 4, Column 11, Lines 34-35, please delete the phrase "location combination having the signal strength, signal quality and/or (RF) line-of-sight" and replace with "location combination having a stronger signal strength, signal quality and/or (RF) line-of-sight".

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*